A. G. INGLE.
DISPLAY RACK FOR AXES.
APPLICATION FILED FEB. 28, 1911.
1,095,401.
Patented May 5, 1914.
2 SHEETS—SHEET 1.
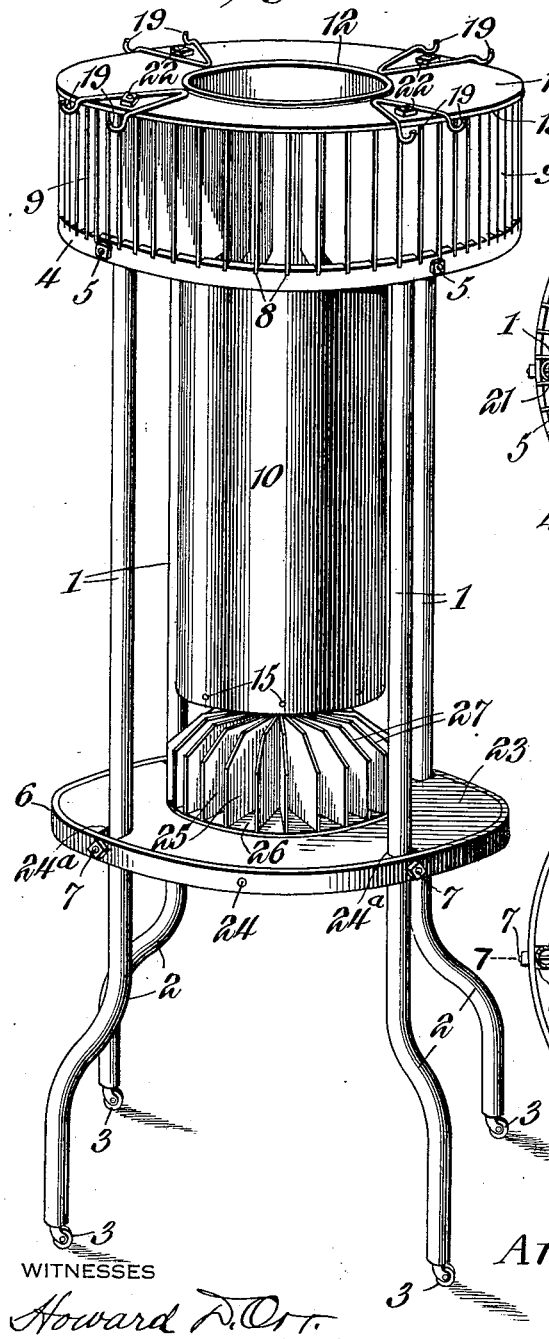
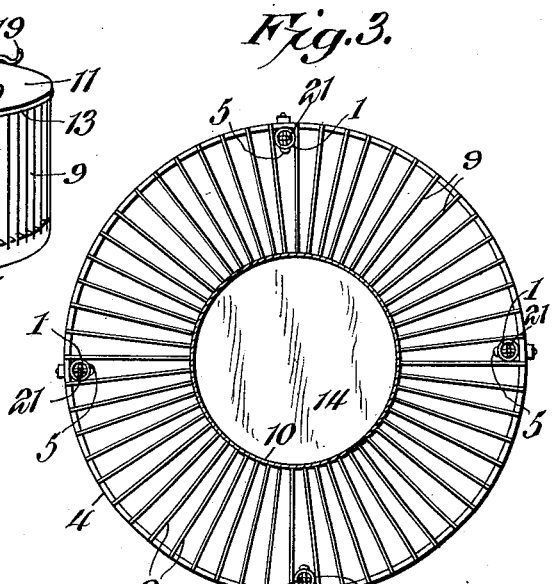
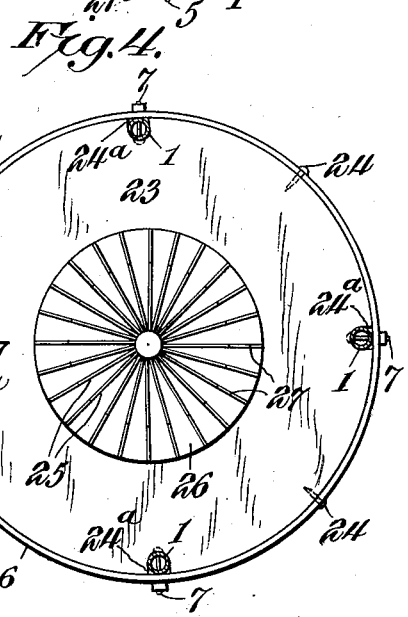
Arthur G. Ingle, INVENTOR,
WITNESSES
BY
ATTORNEY

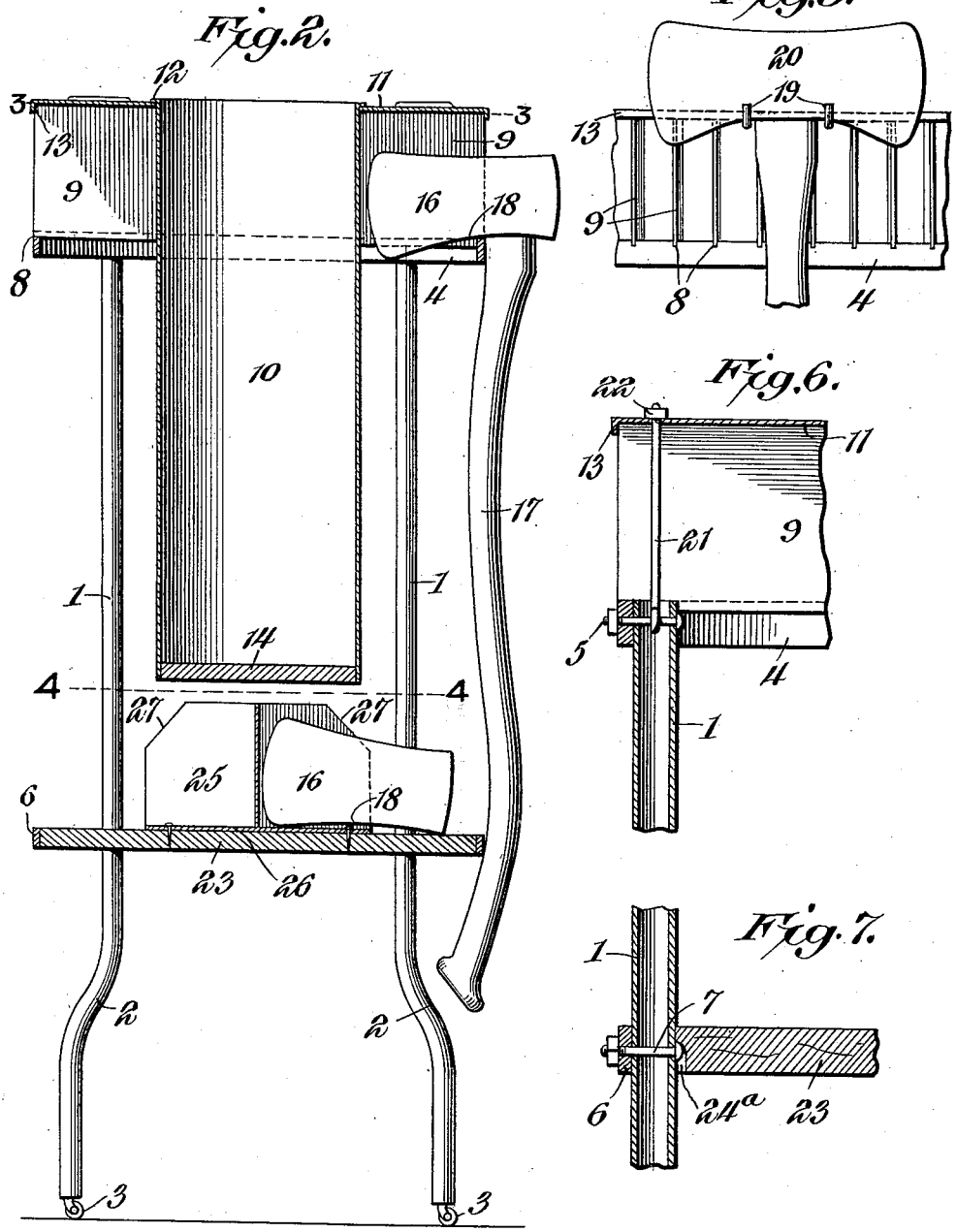

UNITED STATES PATENT OFFICE.

ARTHUR G. INGLE, OF SEILING, OKLAHOMA.

DISPLAY-RACK FOR AXES.

1,095,401. Specification of Letters Patent. Patented May 5, 1914.

Application filed February 28, 1911. Serial No. 611,481.

*To all whom it may concern:*

Be it known that I, ARTHUR G. INGLE, a citizen of the United States, residing at Seiling, in the county of Dewey and State of Oklahoma, have invented a new and useful Display-Rack for Axes, of which the following is a specification.

This invention has reference to improvements in display racks for axes and other implements, and the object of the present invention is to provide a display rack for the purpose whereby a stock of handled axes may be readily exhibited and, also, a stock of ax heads or blades without the handles, and for containing a suitable number of loose handles.

In accordance with the present invention there is provided a stand of suitable height at the top of which there is a holder formed with a circumferential series of pockets, each designed to receive an ax head, and coincident with this series of pockets, and also at a lower point, connecting rings for the legs of the stand are provided in such position as to hold the handles of axes, the heads of which are lodged in pockets at the top of the stand, the arrangement being such that the axes may be readily removed from the stand, but liability of accidental displacement of an ax from the stand is practically eliminated. Furthermore, provision is made for the display of a limited number of double-edge axes, and for the display of an appropriate number of unmounted ax heads or blades while central to the series of pockets at the top of the stand there is provided a pendent holder for the reception of ax handles. The stand is adapted for the support and display of axes of different weights and lengths of handle, and the stand as a whole is readily portable, so that it may be moved from point to point as desired or turned around for the display of all the axes carried thereby. The stand is susceptible of modification in structure and in capacity, so that it may be made to carry a comparatively small number of axes when filled to its capacity, or it may be made larger to carry a commensurately larger number of axes in displayed position, and, therefore, the invention is not confined to the exact structure shown in the accompanying drawings forming a part of this specification, and to which drawings reference is made for an understanding of the following description.

In the drawings:—Figure 1 is a perspective view of the display stand for axes, but with the axes omitted. Fig. 2 is a longitudinal diametric section of the stand showing an ax and an unmounted ax head in position. Fig. 3 is a section on the line 3—3 of Fig. 2, omitting the terminal flange of the cover. Fig. 4 is a section on the line 4—4 of Fig. 2. Fig. 5 is an elevation of a portion of the ax head receiving drum at the top of the stand showing a double-edge ax in position. Fig. 6 is a section on a larger scale than the other figures in a radial plane longitudinal to one of the legs and extending a short distance into the ax receiving drum. Fig. 7 is a section on the line 7—7 of Fig. 4 on a scale substantially that of Fig. 6.

Referring to the drawings, there is shown a stand provided with four legs 1, although the particular number of legs mentioned is not mandatory. These legs are preferably made of piping and at the lower or supporting ends are formed with a compound curve 2 and at their bottoms have casters 3. At the upper ends, the stand being considered as upright, the legs are connected together by a band 4 which may be made of strap iron, which may be formed into an endless hoop by welding or otherwise, and the legs, which may terminate at the upper ends coincident with the top of the hoop, are united thereto by bolts 5 traversing the band 4 and the adjacent portion of each leg 1. Near the lower ends of the legs they are united by another band 6 also of strap iron, and made endless by welding or otherwise, and this band 6 is united by bolts 7 to the respective legs 1 in the same manner as the band 4 is united to said legs. The upper edge of the band 4 is provided with notches 8 which may be equi-distantly disposed and are radial to the center of the band. The notches 8 receive the outer ends of a circular series of partitions 9 which may be made of galvanized sheet iron and the inner ends of these partitions which are directed toward the center line of the stand are united by soldering or otherwise to the outer wall of a cylindrical receptacle 10 extending toward the bottom of the stand within the space defined by the legs 1. The tops of the partitions 9 have applied to them a cover 11 which may be in the form of an annulus through which the upper end of the receptacle 10 extends and over the inner edge of which the corresponding upper edge of the receptacle is upset, as indicated at 12, while the outer margin of the cover 11 is provided with a flange 13 embracing the several partitions 9. The several members 9, 10 and 11 may be united in any suitable manner to make a rigid structure, the receptacle 10 being open at the upper end and at the lower end closed by a head 14, which may be of wood, the sides of the receptacle 10 like the partitions 9 being preferably of galvanized sheet iron. Of course, the head 14 may be made of other material, but wood is to be preferred, and the head 14 may be secured to the receptacle 10 by nails 15 or other fastening devices. The spaces between the partitions 9 taper toward the cylinder 10 and constitute a circular series of pockets of a shape readily receptive of the cutting ends of ax heads 16, one of which is shown in one of the pockets in Fig. 2, such ax being provided with a handle 17 of customary form. That edge of the blade or head of the ax toward the handle is usually curved, as indicated at 18, the cutting end of the ax being wider in the direction of the length of the handle than the eye end of the ax, so that the ax head 16 may be introduced into a pocket between the partitions 9 until the handle abuts against the outer edge of the ring 4 when the other end of the handle will extend below the ring 6, but because of the overbalancing of the ax by the handle and the eye end of the head, both of which are in general beyond the plane of the outer edges of the two rings 4 and 6, the lower end of the handle, that is the end extending below the ring 6, has a constant tendency toward the center line of the rack and the handle is, therefore, kept in engagement with the ring 6, while the weight of the ax will prevent withdrawal of the head 16 from the pocket in which it is seated, because the ax cannot be withdrawn unless elevated sufficiently to permit the escape of the wider end by the upper edge of the ring 4. At the same time the sharp edge of the ax is thoroughly protected from injury and the space between the ring 4 and the receptacle 10 is such that the edge of the ax cannot come into contact with such receptacle and consequently the sharp edge is thoroughly protected from injury. The cover 11 is not only protective to the portions of the ax blades housed within the pockets, the metal of such portions usually being exposed while the heads are commonly protected by a coating of paint or the like, but the cover 11 by being fastened to the partitions 9 serves to stiffen the entire circular series of ax receiving pockets in the drum or cage at the upper end of the stand. The several pockets are protected to a greater or less extent by the cover 11 from the entrance of dust and dirt and such dust and dirt as may enter the pockets finds ready escape through the open lower ends of these pockets, which are open from the inner wall of the ring 4 to the outer wall of the receptacle 10.

The cover has secured to it at appropriate intervals pairs of hooks 19 in overhanging relation to the outer edge of the cover, these pairs of hooks being shown as constituting the terminals of the legs of V-shaped pieces of wire which may be soldered to the top of the cover or any other appropriate arrangement may be provided. The purpose of the hooks is to sustain double-edge axes by their heads 20, as shown in Fig. 5 with the handles in pendent position.

In order to stiffen the cage portion of the rack, an eye bolt 21 is applied to each bolt 5 where traversing the corresponding leg 1 and is continued upward through the appropriate pocket through and above the cover, where the nut 22 of the bolt may engage the top of the cover. Because of the presence of the bolt 21 the particular pocket is not available for an ordinary ax head 16, and so the pairs of hooks 19 are located in straddling relation to each pocket traversed by a bolt 21, and it is to these points that the double-edge axes may be sustained, but the presence of these double-edge axes does not interfere with the lodging of other axes in the remaining pockets of the circular series at the top of the rack.

Secured to the ring 6 and substantially filling the space inclosed by such ring is a disk 23 preferably, though not necessarily, of wood which may be secured to the ring by nails 24 or otherwise. The disk 23 is cut out at the margin, as indicated at 24ª, for the passage of the legs 1. Lodged centrally on the disk 23 is a circular series of radially disposed partitions 25 mounted on a disk 26 of smaller diameter than the disk 23 and secured thereto in any suitable manner. This series of partitions has its center line coincident with the center line of the body of the rack, and those corners of the partitions which may be termed the upper outer corners are beveled, as indicated at 27. The partitions 25 and the basic disk 26 may be made of galvanized sheet iron, and the parts may be soldered together or otherwise secured, so that the space between the partitions 25 constitutes pockets in which ax heads 16 detached from the handles may be lodged, the cutting edges of these heads being directed toward the center of the group of pockets, while the eye ends of the ax heads may rest upon the disk 23 outside the disk 26.

The receptacle 10 may be utilized for holding separate ax handles or other handles so that the rack is adapted to display a circular series of axes with the heads uppermost and the handles pendent, a limited number of double-edge axes also with the heads uppermost and the handles pendent, an appropriate number of unmounted ax heads supported by the pockets between the partitions 25 and by the disk 23, and an appropriate number of unattached handles carried by the receptacle 10.

The compound curve 2 of the legs 1 near the bottom contributes to the formation of an expanded base for the rack, whereby its stability is increased.

While in the foregoing description and in the following claim the device is described as a rack for the display of axes, it will be understood that it may be utilized for the display of hatchets and other like articles and that where other articles than axes are displayed such changes in the proportions and arrangements of parts as may be necessary to adapt the structure to the different articles is within the scope of the present invention, for such changes do not affect the salient features of the invention.

What is claimed is:—

A display rack for axes including a vertical cylindrical receptacle having a bottom and side walls and open at the top, a series of radial partitions extending outwardly from the upper portion of the receptacle and secured at their inner edges to the same and forming intervening ax blade receiving compartments, an annular cover surrounding the upper end of the receptacle and arranged upon the radial partitions and covering the compartments, a band connecting the radial compartments at the lower outer corners thereof and constituting a single support for and receiving the blades of the axes, the space between the band and the cylindrical receptacle being open to form open bottoms of the compartments to permit the blades of the axes to extend downwardly through the same, supporting legs secured to the said band, and a lower shelf connecting the legs and forming an abutment for the handles of the axes and arranged to prevent the same from swinging on the supporting band.

In testimony, that I claim the foregoing as my own, I have hereto affixed my signature in the presence of two witnesses.

ARTHUR G. INGLE.

Witnesses:
AMOS BACHMAN,
J. B. SKINNER.